US008472082B2

(12) United States Patent
Aonuma

(10) Patent No.: US 8,472,082 B2
(45) Date of Patent: Jun. 25, 2013

(54) IMAGE PROCESSING DEVICE WITH COMPENSATION FOR A FOCAL POINT SHIFT OF THE PRINT HEAD

(75) Inventor: Koki Aonuma, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 597 days.

(21) Appl. No.: 12/720,280

(22) Filed: Mar. 9, 2010

(65) Prior Publication Data
US 2010/0245853 A1 Sep. 30, 2010

(30) Foreign Application Priority Data

Mar. 31, 2009 (JP) ................................ 2009-085991

(51) Int. Cl.
*G06K 15/00* (2006.01)
*H03M 1/20* (2006.01)

(52) U.S. Cl.
USPC .......... 358/3.13; 358/3.14; 358/3.16; 341/131

(58) Field of Classification Search
None
See application file for complete search history.

(56) References Cited

U.S. PATENT DOCUMENTS 5,555,102 A * 9/1996 Dalton ......................... 358/3.14
5,766,807 A * 6/1998 Delabastita et al. .............. 430/6
5,774,165 A 6/1998 Nakajima et al.

FOREIGN PATENT DOCUMENTS

| EP | 0 910 206 A1 | 4/1999 |
| JP | 8-142406 | 6/1996 |
| JP | 2001-111823 | 4/2001 |
| JP | 2004-188665 | 7/2004 |
| JP | 2005-303446 A | 10/2005 |

OTHER PUBLICATIONS

Japanese Official Action mailed Nov. 30, 2010 in corresponding Japanese Patent Application No. 2009-085991, together with English language translation.
Global Graphics: "Harlequin RIP, Technical note Hqn015", Jun. 2001, XP002583186.
Extended European Search Report dated Jun. 25, 2010.
European Office Action dated May 15, 2012 from related European Patent Application No. 10 155 944.1.

* cited by examiner

*Primary Examiner* — Thomas Lett
(74) *Attorney, Agent, or Firm* — Scully, Scott, Murphy & Presser, P.C.

(57) ABSTRACT

An image processing device includes a storing unit for storing a dither matrix. The dither matrix has a plurality of dot regions divided into a plurality of sub-matrices. A creating unit is configured to create binary image data by comparing an input value to threshold values of each sub-matrix. The plurality of sub-matrices includes a first sub-matrix having a first threshold value smallest among threshold values in the first sub-matrix; a second sub-matrix having a plurality of threshold values that are smaller than the first threshold value and are arranged adjacent to each other; a third sub-matrix; having a second threshold value largest among threshold values in the third sub-matrix; and a fourth sub-matrix having a plurality of threshold values that are larger than the second threshold value and are arranged adjacent to each other.

7 Claims, 12 Drawing Sheets

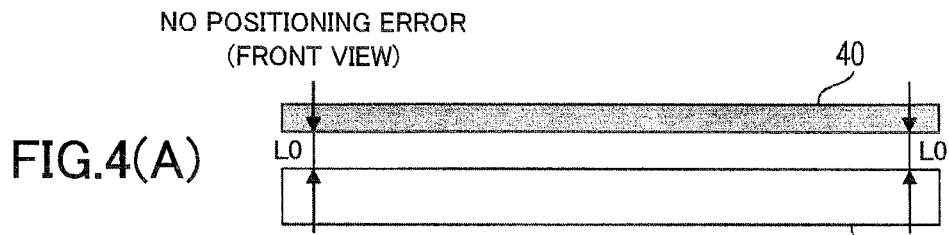
FIG.4(A) NO POSITIONING ERROR (FRONT VIEW)
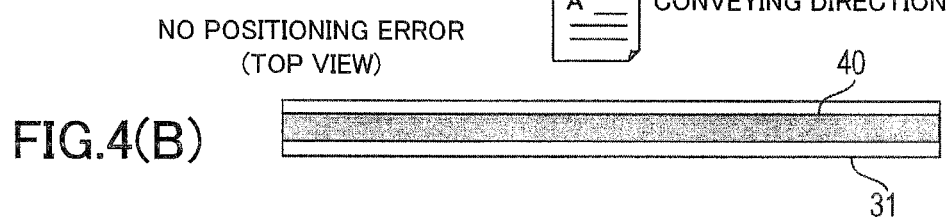
FIG.4(B) NO POSITIONING ERROR (TOP VIEW)
RECORDING MEDIUM CONVEYING DIRECTION
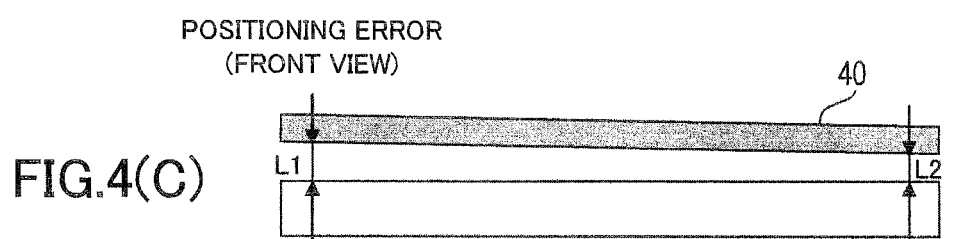
FIG.4(C) POSITIONING ERROR (FRONT VIEW)
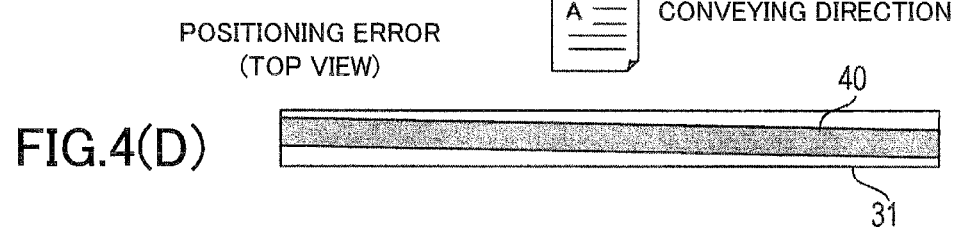
FIG.4(D) POSITIONING ERROR (TOP VIEW)
RECORDING MEDIUM CONVEYING DIRECTION

LIGHT IMAGE AREA
(NO POSITIONING ERROR)

LIGHT IMAGE AREA
(POSITIONING ERROR)

DARK IMAGE AREA
(NO POSITIONING ERROR)

DARK IMAGE AREA
(POSITIONING ERROR)

FIG.7

| 128 | 65  | 81  | 208 | 136 | 73  | 89  | 216 | 131 | 68  | 84  | 211 | 139 | 76  | 92  | 219 |
|-----|-----|-----|-----|-----|-----|-----|-----|-----|-----|-----|-----|-----|-----|-----|-----|
| 97  | 1   | 33  | 160 | 105 | 9   | 41  | 168 | 100 | 4   | 36  | 163 | 108 | 12  | 44  | 171 |
| 113 | 17  | 49  | 192 | 121 | 25  | 57  | 200 | 116 | 20  | 52  | 195 | 124 | 28  | 60  | 203 |
| 176 | 144 | 224 | 240 | 184 | 152 | 232 | 248 | 179 | 147 | 227 | 243 | 187 | 155 | 235 | 251 |
| 140 | 77  | 93  | 220 | 132 | 69  | 85  | 212 | 143 | 80  | 96  | 223 | 135 | 72  | 88  | 215 |
| 109 | 13  | 45  | 172 | 101 | 5   | 37  | 164 | 112 | 16  | 48  | 175 | 104 | 8   | 40  | 167 |
| 125 | 29  | 61  | 204 | 117 | 21  | 53  | 196 | 128 | 32  | 64  | 207 | 120 | 24  | 56  | 199 |
| 188 | 156 | 236 | 252 | 180 | 148 | 228 | 244 | 191 | 159 | 239 | 255 | 183 | 151 | 231 | 247 |
| 130 | 67  | 83  | 210 | 138 | 75  | 91  | 218 | 129 | 66  | 82  | 209 | 137 | 74  | 90  | 217 |
| 99  | 3   | 35  | 162 | 107 | 11  | 43  | 170 | 98  | 2   | 34  | 161 | 106 | 10  | 42  | 169 |
| 115 | 19  | 51  | 194 | 123 | 27  | 59  | 202 | 114 | 18  | 50  | 193 | 122 | 26  | 58  | 201 |
| 178 | 146 | 226 | 242 | 186 | 154 | 234 | 250 | 177 | 145 | 225 | 241 | 185 | 153 | 233 | 249 |
| 142 | 79  | 95  | 222 | 134 | 71  | 87  | 214 | 141 | 78  | 94  | 221 | 133 | 70  | 86  | 213 |
| 111 | 15  | 47  | 174 | 103 | 7   | 39  | 166 | 110 | 14  | 46  | 173 | 102 | 6   | 38  | 165 |
| 127 | 31  | 63  | 206 | 119 | 23  | 55  | 198 | 126 | 30  | 62  | 205 | 118 | 22  | 54  | 197 |
| 190 | 158 | 238 | 254 | 182 | 150 | 230 | 246 | 189 | 157 | 237 | 253 | 181 | 149 | 229 | 245 |

FIG.8(A)

| | | | | | | | | | | | | | | | |
|---|---|---|---|---|---|---|---|---|---|---|---|---|---|---|---|
| 1 | | | | 9 | | | | 4 | | | | 12 | | | |
| 17 | | | | 25 | | | | 20 | | | | 28 | | | |
| | | | | | | | | | | | | | | | |
| | | | | | | | | | | | | | | | |
| 13 | | | | 5 | | | | 16 | | | | 8 | | | |
| 29 | | | | 21 | | | | 32 | | | | 24 | | | |
| | | | | | | | | | | | | | | | |
| | | | | | | | | | | | | | | | |
| 3 | | | | 11 | | | | 2 | | | | 10 | | | |
| 19 | | | | 27 | | | | 18 | | | | 26 | | | |
| | | | | | | | | | | | | | | | |
| | | | | | | | | | | | | | | | |
| 15 | | | | 7 | | | | 14 | | | | 6 | | | |
| 31 | | | | 23 | | | | 30 | | | | 22 | | | |
| | | | | | | | | | | | | | | | |

FIG.8(B)

| | | | | | | | | | | | | | | | |
|---|---|---|---|---|---|---|---|---|---|---|---|---|---|---|---|
| | | | | | | | | | | | | | | | |
| | 224 | 240 | | | 228 | 244 | | | 227 | 243 | | | 235 | 251 | |
| | | | | | | | | | | | | | | | |
| | | | | | | | | | | | | | | | |
| | 236 | 252 | | | 234 | 250 | | | 239 | 255 | | | 231 | 247 | |
| | | | | | | | | | | | | | | | |
| | | | | | | | | | | | | | | | |
| | 226 | 242 | | | 234 | 250 | | | 225 | 241 | | | 233 | 249 | |
| | | | | | | | | | | | | | | | |
| | | | | | | | | | | | | | | | |
| | 238 | 254 | | | 230 | 246 | | | 237 | 253 | | | 229 | 245 | |

FIG.9(A)

|   |   |   |   |   |   |   |   |   |   |   |   |
|---|---|---|---|---|---|---|---|---|---|---|---|
|   | 3 |   |   | 15|   |   | 6 |   |   | 18|   |
|   | 21|   |   | 29|   |   | 24|   |   | 32|   |
|   |   |   |   |   |   |   |   |   |   |   |   |
|   | 9 |   |   | 1 |   |   | 12|   |   | 13|   |
|   | 25|   |   | 2 |   |   | 28|   |   | 14|   |
|   |   |   |   |   |   |   |   |   |   |   |   |
|   | 5 |   |   | 17|   |   | 4 |   |   | 16|   |
|   | 23|   |   | 31|   |   | 22|   |   | 30|   |
|   |   |   |   |   |   |   |   |   |   |   |   |
|   | 11|   |   | 19|   |   | 10|   |   | 7 |   |
|   | 27|   |   | 20|   |   | 26|   |   | 8 |   |

FIG.9(B)

| | | | 235 | 253 | | | 227 | 241 | | | 232 | 250 | | | 224 | 238 |
| | | | 231 | 247 | | | 254 | 255 | | | 228 | 244 | | | 242 | 243 |
| | | | 233 | 251 | | | 225 | 239 | | | 234 | 252 | | | 226 | 240 |
| | | | 229 | 245 | | | 236 | 237 | | | 230 | 246 | | | 248 | 249 |

VOLTAGE CHANGE IN PHOTOSENSITIVE DRUM
WHEN SINGLE DOT IS FORMED

VOLTAGE CHANGE IN PHOTOSENSITIVE DRUM
WHEN CONTINUOUS DOTS FORMED
IN POSITIONING ERROR STATE

VOLTAGE CHANGE IN PHOTOSENSITIVE DRUM
WHEN CONTINUOUS DOTS ARE NOT FORMED
IN POSITIONING ERROR STATE

FIG.12(A)

|   |   |   |   |
|---|---|---|---|
| 1  2 | 17  29 | 5  16 | 20  32 |
| 12  25 | 7  21 | 15  28 | 10  24 |
| 4  11 | 19  31 | 3  6 | 18  30 |
| 14  27 | 9  23 | 13  26 | 8  22 |

FIG.12(B)

|   |   |   |   |
|---|---|---|---|
| 254 255 | 227 239 | 240 251 | 224 236 |
| 231 244 | 235 249 | 228 241 | 232 246 |
| 245 252 | 225 237 | 250 253 | 226 238 |
| 229 242 | 233 247 | 230 243 | 234 248 |

IMAGE PROCESSING DEVICE WITH COMPENSATION FOR A FOCAL POINT SHIFT OF THE PRINT HEAD

CROSS REFERENCE TO RELATED APPLICATION

This application claims priority from Japanese Patent Application No. 2009-085991 filed Mar. 31, 2009. The entire content of the priority application is incorporated herein by reference.

TECHNICAL FIELD

The present invention relates to an image processing device.

BACKGROUND

One type of widely used image-forming device forms an electrostatic latent image on a photosensitive member by exposing the photosensitive member to light after applying a charge to the surface thereof, and subsequently develops the latent image by depositing toner thereon. This type of image-forming device may employ means for scanning a laser light beam over the surface of the photosensitive member as exposing means, while another type of exposing means well known in the art is an LED print head comprising a plurality of light-emitting diodes (LEDs).

SUMMARY

It is conceivable that the relative position of the LED print head and the photosensitive member in such an image-forming device may become offset due to one of various factors, such as positional error in the LED print head occurring during or after mounting, irregularities in the manufactured precision of parts, or deterioration of the parts over time. If the length of the optical paths of light from the LEDs to the surface of the photosensitive member change due to such offset in the positional relationship of these components, the focal point of the LED light may be shifted off the surface of the photosensitive member so that light emitted from the LEDs does not converge on the surface of the photosensitive member.

When the focal point of the LED print head is not correct (has shifted), a low-density image may be printed lighter than normal or, conversely, a high-density image may be printed darker than normal. More specifically, when rendering a low-density image with isolated dots, some of the isolated dots may be blurred, omitted, or otherwise not properly formed when the focal point of the LED print head is shifted, resulting in a lower density than normal. Conversely, when rendering a high-density image having isolated regions with no dots, the regions without dots may be filled in due to scattered developer or other reasons, resulting in a higher density than normal.

One conceivable method of resolving this deviation in the positional relationship of the LED print head and the photosensitive member is to provide the image-forming device with an adjustment mechanism for finely adjusting this positional relationship. However, this adjustment would require a technical operation that would not be easy for an end-user to perform.

In view of the foregoing, it is an object of the present invention to provide an image processor capable of easily restraining a drop in image reproducibility of an image-forming device comprising exposing means and a photosensitive member caused by a shift in the focal point of the exposing means relative to the surface of the photosensitive member.

In order to attain the above and other objects, the invention provides an image processing device including a storing unit and a creating unit. The storing unit stores a dither matrix. The dither matrix has a plurality of dot regions and has a threshold value at each of the dot regions. The plurality of dot regions are divided into a plurality of sub-matrices. The creating unit is configured to create binary image data by comparing an input value to the threshold value. The plurality of sub-matrices include a first sub-matrix and a second sub-matrix. The first sub-matrix has a first threshold value smallest among threshold values in the first sub-matrix. The second sub-matrix has a plurality of threshold values that are smaller than the first threshold value and are arranged adjacent to each other. Each of all remaining sub-matrices has at least one threshold value smaller than the first threshold value. The plurality of sub-matrices include a third sub-matrix and a fourth sub-matrix. The third sub-matrix has a second threshold value largest among threshold values in the third sub-matrix. The fourth sub-matrix has a plurality of threshold values that are larger than the second threshold value and are arranged adjacent to each other. Each of all remaining sub-matrices has at least one threshold value larger than the second threshold value.

BRIEF DESCRIPTION OF THE DRAWINGS

The particular features and advantages of the invention as well as other objects will become apparent from the following description taken in connection with the accompanying drawings, in which:

FIGS. 4(A) and 4(B) are conceptual diagrams illustrating a front view and a top view of a LED print head and a photosensitive drum in a state of no positioning error, respectively;

FIGS. 4(C) and 4(D) are conceptual diagrams illustrating a front view and a top view of the LED print head and the photosensitive drum in a state of positioning error, respectively;

FIG. 7 is a conceptual diagram showing a conventional dither matrix;

FIGS. 8 (A) and 8 (B) are conceptual diagrams showing a conventional dither matrix when the input value is 16 and when the input value is 239, respectively;

FIGS. 9 (A) and 9 (B) are conceptual diagrams showing a dither matrix stored in the image processing device when the input value is 16 and when the input value is 239, respectively;

FIGS. 12 (A) and 12(B) are conceptual diagrams showing a dither matrix stored in an image processing device according to a second embodiment when the input value is 16 and when the input value is 239, respectively.

DETAILED DESCRIPTION

Figure 1:
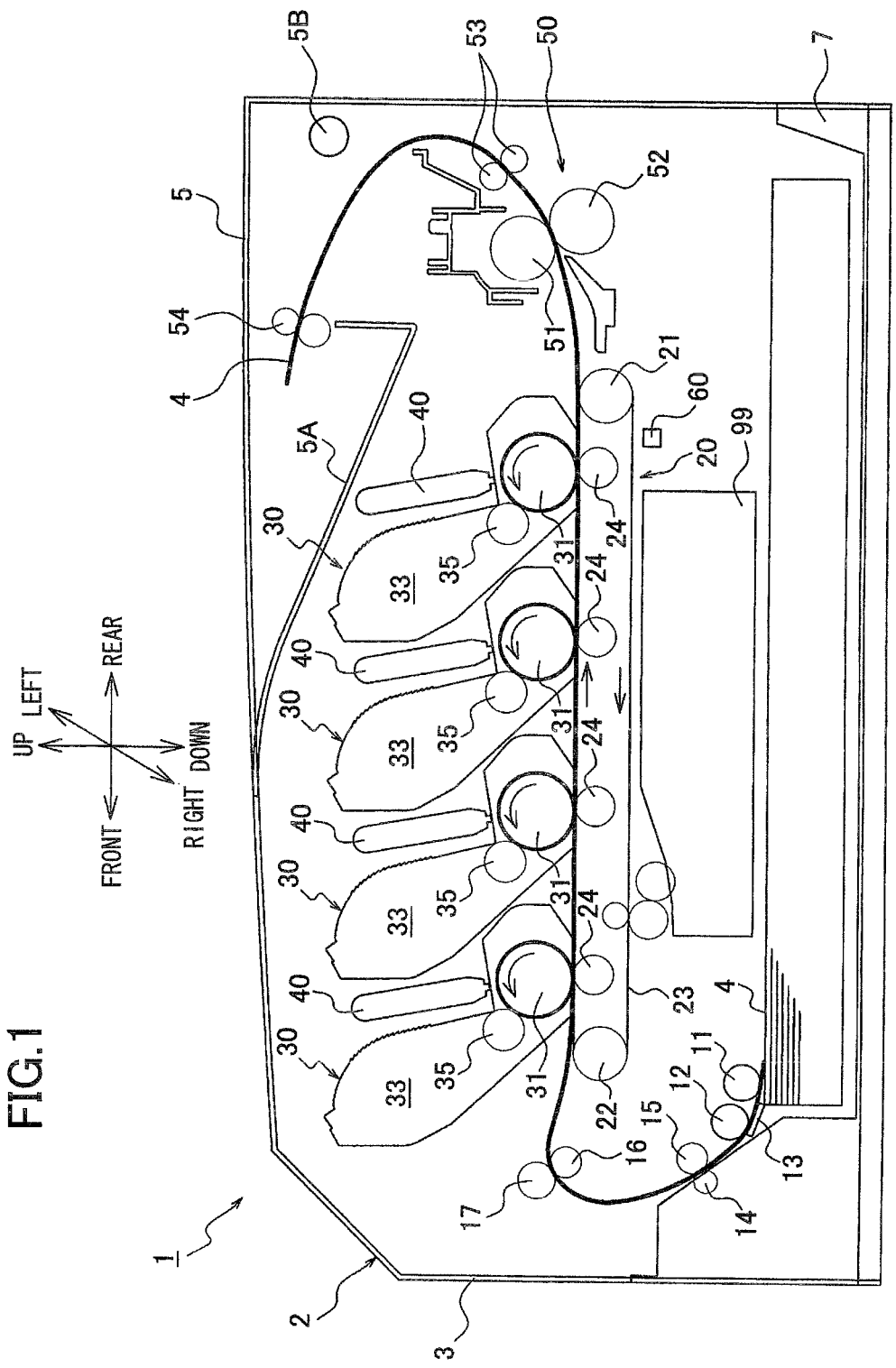
FIG. 1 is a cross-section view of an image processing device according to a first embodiment of the invention.

FIG. 1 is a side sectional view schematically showing the structure of an image forming device 1 as an image forming device according to a first embodiment. In the following description, the left side of FIG. 1 is defined as the front side.

Figure 2:
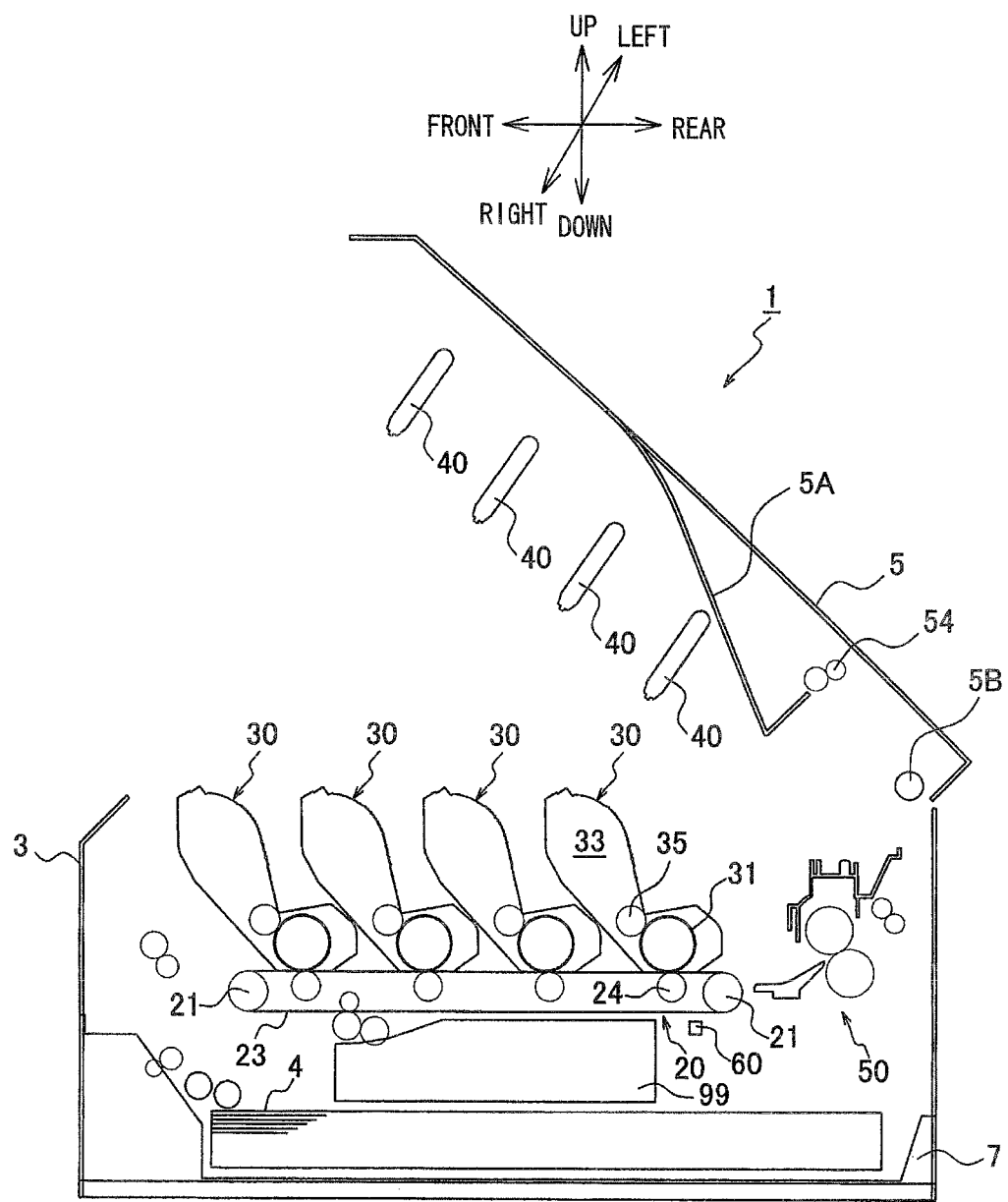
FIG. 2 is a cross-section view of the image processing device of FIG. 1 when a top cover provided in the image processing device is opened.

The image forming device 1, which is a direct transfer tandem-type color laser printer, includes a substantially box-like main casing 2 as shown in FIG. 1. On the front surface of the main casing 2, a front cover 3 is provided. On the top surface of the main body 2, a discharge tray 5A for placing recording sheets 4 on which image formation has been formed is formed. A top cover 5 is formed integrally with the discharge tray 5A and covers the main casing 2 from above. The top cover 5 is capable of openable and closable by swinging around an upper-rear end of the image forming device 1 as shown in FIG. 2. By opening the top cover 5, it is possible that an image forming unit 30 and belt unit 20 described later can be pulled out from inside of the main casing 2.

A feed tray 7 for accommodating a plurality sheets of recording paper 4 on which images should be formed is detachably mounted on the main casing 2 by sliding from rear side to front side in the bottom of the main casing 2. In the feed tray 7, a pressing plate (not shown) for supporting the recording sheets 4 stacked thereon is provided. A feed roller 11 for feeding the recording paper 4 is provided at one end (at the front upper side) of the feed tray 7. A separating roller 12 and separating pad 13 for separating one from the sheets 4 are provided on the downstream side in the conveying direction of the recording paper 4 with respect to the feed roller 11 at the front side of the feed roller 11.

The uppermost sheet of the recording paper 4 is separated from the stacked recording papers 4 by the separating roller 12 and is pinched the sheet between a paper dust roller 14 for removing paper dust from the sheet and confront roller 15, and then the uppermost sheet is fed toward a pair of registration rollers 16 and 17. Subsequently, the pair of registration rollers 16 and 17 convey the topmost sheet 4 conveyed from the paper dust roller 14 to a belt unit 20 at a prescribed timing.

The belt unit 20 is provided in rear of the registration rollers 16 and 17. The belt unit 20 is detachably mounted on the main casing 2 and includes a drive roller 21, a tension roller 22, and a conveying belt 23 (transfer conveying belt). The drive roller 21 and the tension roller 22 are arranged separately in a direction from front to rear (in a front-rear direction) for a prescribed distance. The conveying belt 24 is mounted around the drive roller 21 and the tension roller 22. The conveying belt is an endless belt formed of a resin such as a polycarbonate. The conveying belt 23 moves circulatory clockwise direction in FIG. 1 by rotation of the drive roller 21 and conveys the recording paper 4 supported on the conveying belt 23 rearward.

Four transfer rollers 24 are disposed inside the conveying belt 23 at positions opposing photosensitive drums 31 described later with the conveying belt 23 interposed therebetween. The transfer rollers 24 are arranged in the front-rear direction for each constant distance. When toner image is transferred on the recording paper 4, a transfer bias voltage is applied between the transfer rollers 24 and photosensitive drums 31.

In the middle portion of the main casing 2, four image forming units 30 are provided and correspond to four LED print heads 40 for exposing the surface of the photosensitive drum 31. Four image forming units 30 correspond to black (K), yellow (Y), magenta (M), and cyan (C) which are arranged from front side. Each image forming unit 30 and corresponding LED print head 40 are disposed perpendicular to a conveying direction for conveying the recording paper 4. Each LED print head 40 includes a LED array arranged in a main scanning direction from left to right for emitting light and an optical lens for focusing light emitted from the LED array on the surface of the photosensitive drum 31.

Each image forming unit 30 includes the photosensitive drum 31, toner accommodating section 33, developer roller 35 and the like. The photosensitive drum 31 includes a grounded drum body configured of metal and a photosensitive layer covering the surface of the drum body and being charged positively. A Scorotron charger (not shown) applies a uniform charge of positive polarity to the surface of the photosensitive drum 31 while the photosensitive drum 31 rotates. Subsequently, the plurality of LED disposed at lower end of the LED print heads 40 expose the surfaces of the photosensitive drums 31. In this way, the image forming device 1 forms an electrostatic latent image on the surface of each photosensitive drum 31 corresponding to an image to be formed on the recording paper 4.

Here, a personal computer 80 (FIG. 3) or other external device transmits image data to the image forming device 1 representing an image to be printed on the recording paper 4. The image forming device 1 of this embodiment performs a color conversion process on the print data received from this external source (in this embodiment, the print data is image data having 256 gradations for each color in the RGB color space) into image data in the CMYK color space corresponding to the colors of toner used in the image forming device 1. The image forming device 1 subsequently performs a binarization process for converting the CMYK image data having 256 gradations for each color resulting from the color conversion process into binary image data for each of the CMYK colors. In the binarization process, the image forming device 1 compares the input level of the pixel value (0-255) to a threshold value in a prepared dither matrix for each pixel in the image expressed by the image data and sets a dot corresponding to the rotation of the pixel to ON when the input level is greater than or equal to the threshold and to OFF when the input level is less than the threshold. Next, the image forming device 1 controls the LED print head 40 corresponding to each color to form an electrostatic latent image on the surface of the respective photosensitive drum 31 based on the binary image data generated for the corresponding color.

A toner accommodating section 33 accommodates single-component nonmagnetic toner charged positively for each color of C, M, Y, and K. The toner accommodated in the toner accommodating section 33 is charged in a positive polarity by rotation of the developer roller 35 and is evenly supplied to the surface of developer roller 35 as thin layer having a prescribed thickness. Subsequently, by rotation of the developer roller 35, toner is supplied to the photosensitive drum 31 to develop the latent image into a toner image when the toner contacts to the photosensitive drum 31. A toner image is formed and carried on the surface of the photosensitive drum 31 by supplying the toner on exposed areas of the surface of photosensitive drum 31. The toner image which is a visible image formed by the toner.

Then, the toner image carried on the photosensitive drum 31 is transferred to the surface of recording paper 4 subsequently when the recording paper 4 passes between the photosensitive drum 31 and transfer roller 24 by applying transfer bias. After all toner images have been transferred onto the recording paper 4, the belt unit 20 conveys the sheet to a fixing unit 50.

The fixing unit 50 is disposed on the rear side of the conveying belt 23. The fixing unit 50 includes a heating roller 51 that heats the toner transferred onto the paper in order to fix the toner image on the paper, and a pressure roller 52 disposed in opposition to and applying pressure to the heating roller 51. The recording paper 4 conveyed from the belt unit 20 is interposed between the heating roller 51 and pressure roller 52. A halogen lamp (not shown) is provided in the heating roller 51. The toner image is fixed to the recording paper 4 by heat when conveying the recording paper 4 between the heating roller 51 and pressure roller 52. Image formation is complete when the recording paper 4 leaves the fixing unit 50. At this time, the recording paper 4 is conveyed by a conveying roller 53 that is disposed obliquely above rearward the fixing unit 50, and the recording paper 4 is discharged onto the discharge tray 5A by a discharge roller 54 disposed on the upper portion of the main casing 2.

A density sensor 60 is provided obliquely below the drive roller 21 so as to oppose the outer surface of the conveying belt 23. The density sensor 60 is configured to detect patches formed on the conveying belt 23 by the image forming unit 30. Further, a belt cleaner 99 is provided below the conveying belt 23 wound around the drive roller 21 and tension roller 22 in contact to the conveying belt 23 and cleans the density patches formed on the conveying belt 23.

As shown in FIG. 2, the top cover 5 is capable of rotating about a shaft 5B disposed in the lower edge thereof and extending in the left-to-right direction (a direction orthogonal to the moving direction of the conveying belt 23). The four LED print heads 40 are connected to the bottom surface of the top cover 5 via linkages (not shown) that allow the LED print heads 40 to pivot together with the top cover 5. By opening the top cover 5, the operator can separate the LED print heads 40 from the photosensitive drums 31, as shown in FIG. 2. By closing the top cover 5, the LED print heads 40 can be placed in a position opposing the respective photosensitive drums 31, as shown in FIG. 1.

Figure 3:
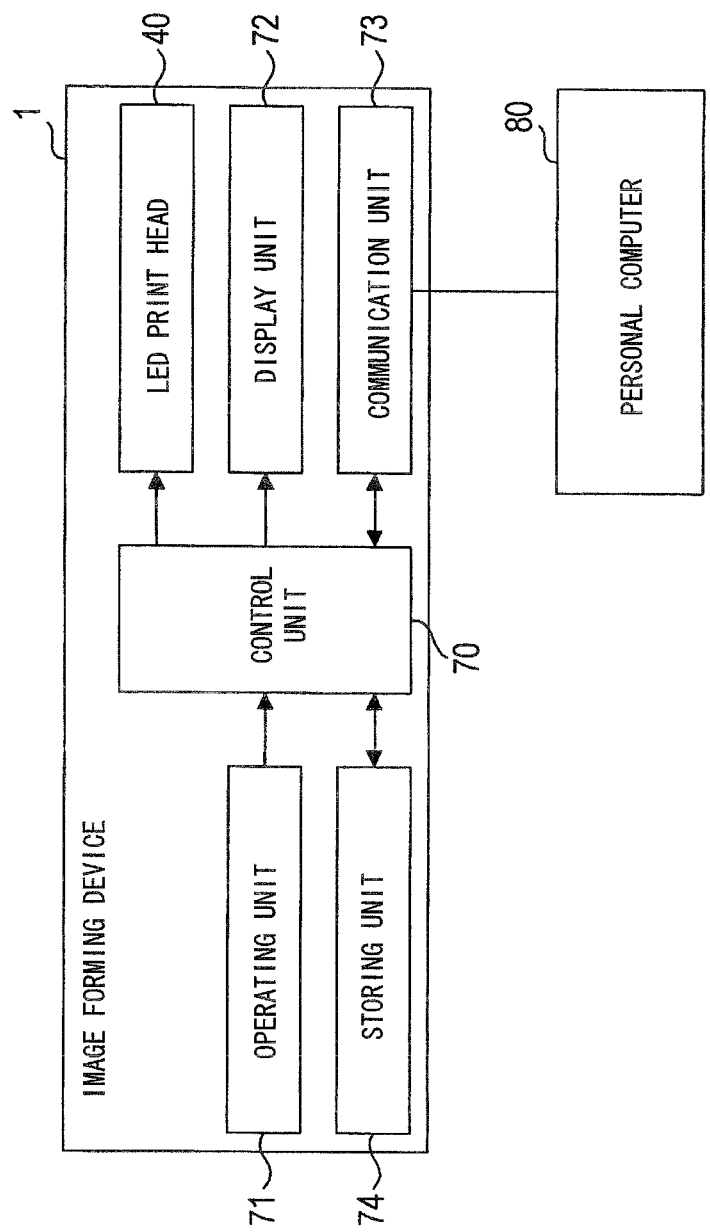
FIG. 3 is a block diagram showing the electrical structure of the image processing device.

As shown in FIG. 3, the image forming device 1 includes the LED print heads 40, a control unit 70, an operating unit 71, a display unit 72, a communication 73, and a storing unit 74. The control unit 70 is a microprocessor for controlling each component of the image forming device 1, and includes a CPU, a ROM, a RAM, and the like (not shown). The CPU executes a printing process described later (FIG. 11) in accordance with programs stored in the ROM.

The operating unit 71 is an input device for enabling a user to input a predetermined command to the image forming device 1 and includes a plurality of operating keys. The display unit 72 is an output device for displaying a visible image indicating various data such as a compact liquid crystal display.

The communication unit 73 is an interface for performing data communication with the external devices including the personal computer 80. The storing unit 74 is a rewritable non-volatile memory device storing various data such as a flash memory. The storing unit 74 stores a dither matrix as described later shown in FIGS. 9(A) and 9(B).

Next, a process executed on the image forming device 1 according to the first embodiment will be described in detail. In the image forming device 1 having the above construction, the relationships between the positions of the LED print heads 40 and photosensitive drums 31 may be incorrect due to a variety of factors, such as positioning error when mounting the LED print heads 40 on the top cover 5, positioning error caused when opening and closing the top cover 5, irregularities in the precision of components, or deterioration in the components over time.

FIGS. 4(A) and 4(B) conceptually illustrate front and top views, respectively, of a LED print head 40 and photosensitive drum 31 in a normal state (i.e., when the positions of the LED print head 40 and photosensitive drum 31 are not offset (hereinafter referred to as a "state of no positioning error"). FIGS. 4(C) and 4(D), on the other hand, conceptually illustrate front and top views, respectively of the LED print head 40 and photosensitive drum 31 when their positions are offset (hereinafter referred to as a "state of positioning error").

The lengths L1 and L2 of optical paths from the LEDs disposed on the lower edge of the LED print head 40 to the surface of the photosensitive drum 31 (see FIG. 4(C)) in the state of positioning error differs from the proper length L0 of optical paths in the state of no positioning error (see FIG. 4(A)). When the length of the optical paths changes in this way, the focal point of the LEDs shifts off the surface of the photosensitive drum 31 so that the light emitted from the LEDs does not converge on the surface of the photosensitive drum 31. Consequently, the LEDs cannot properly form an electrostatic latent image on the surface of the photosensitive drum 31. Specifically, the changes in voltage on the surface of the photosensitive drum 31 become less distinct, preventing toner from properly depositing on the latent image or resulting in toner becoming deposited in areas outside the target latent image.

Figure 5A:
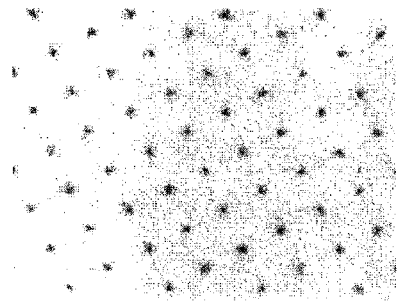
FIGS. 5(A) and 5(B) are enlarged views of light image areas in a state of no positioning error and in a state of positioning error, respectively.
Figure 5B:
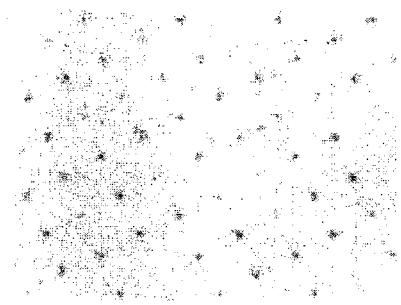
Figure 5C:
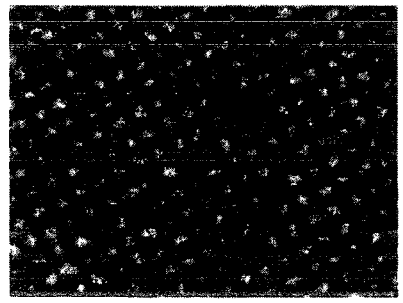
FIGS. 5(C) and 5(D) are enlarged views of dark image areas in a state of no positioning error and in a state of positioning error, respectively.
Figure 5D:
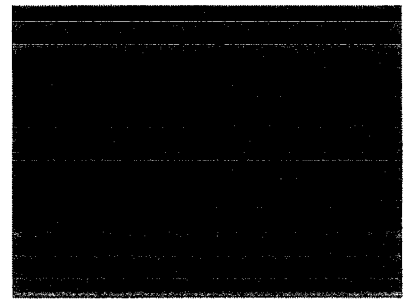

FIGS. 5(A)-5(D) are enlarged views of an image area printed only with black toner. FIG. 5(A) is an enlarged view of a light image area (low-density image area) in the state of no positioning error. FIG. 5(B) is an enlarged view of the light image area in the state of positioning error. FIG. 5(C) is an enlarged view of a dark image area (high-density image area) in the state of no positioning error. FIG. 5(D) is an enlarged view of the dark image area in the state of positioning error.

As described above, isolated dots of the light image area that are formed clearly when there is no positioning error (see FIG. 5(A)) are blurred, omitted, or otherwise not formed properly when there is positioning error (see FIG. 5(B)). In contrast, areas without dots (blank areas) of the dark image area that are formed clearly when there is no positioning error (see FIG. 5(C)) are filled in when there is positioning error (see FIG. 5(D)) due to scattered toner or the like.

Figure 6:
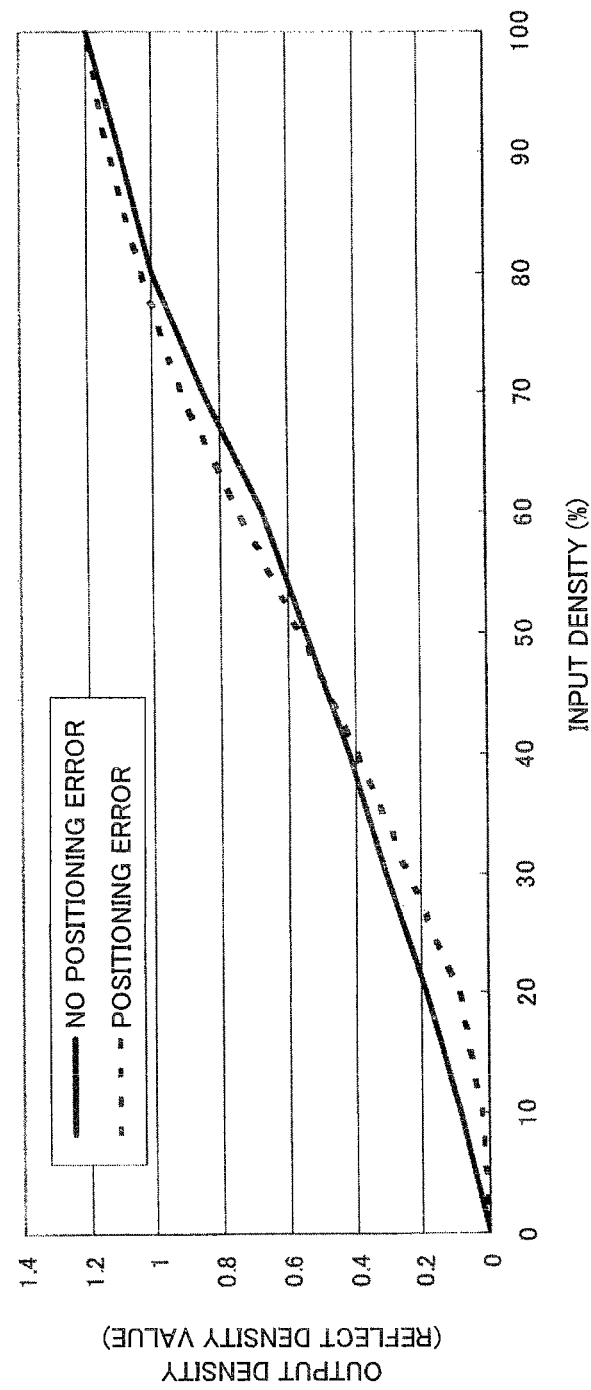
FIG. 6 is a graph showing a relationship between input density and output density.

FIG. 6 shows the output density (measured density of an actually formed toner image) in response to the input density (a density based on the binary image data). As shown in FIG. 6, the density characteristics of the output density in a state of positioning error (indicated by the dotted line; hereinafter referred to as "positioning error characteristics") are such that the density is lower in light areas and higher in dark areas than the output density in a state of no positioning error (indicated by the solid line). Consequently, gradation characteristics of the image forming device 1 in a state of positioning error are greatly worsened when using the conventional dither matrix in which threshold values are set so that all halftone dots grow as uniformly as possible.

FIG. 7 shows an example of the above-described conventional dither matrix configured of sixteen 4×4 sub-matrices arranged four vertically by four horizontally. Thus, the dither matrix has sixteen dot locations in the vertical direction by sixteen dot locations in the horizontal direction. In the dither matrix, each of threshold values from the range 1-255 is allocated on one of the dot locations. The dither matrix is used for representing grayscale values (256 levels) corresponding to each of the input levels 0-255 with a plurality of halftone dots to be formed on the recording paper 4. The threshold values are set in this dither matrix such that each sub-matrix forms a single halftone dot.

The threshold values are set in this conventional dither matrix so that all halftone dots increase in parallel one dot (turned-on-cell) at a time as the input grayscale value increases, in order that all sixteen halftone cells formed by the sixteen sub-matrices grow as uniformly as possible.

Specifically, as shown in FIG. 8(A), one threshold value between 1 and 16 is distributed in each sub-matrix. Here, each sub-matrix includes a halftone dot area and a blank area. The halftone dot area corresponds to the halftone dot to be formed on the recording paper. The blank area is different from the halftone dot area in the sub-matrix. Thus, no halftone dot area with a size of two dots or more is produced before all halftone dot areas have changed from a state of no dot region to a size of one dot region. Similarly, one threshold value between 17 and 32 is distributed in each sub-matrix so that no halftone dot area with a size of three dot regions or greater is produced before all halftone dot areas have changed from a size of one dot region to a size of two dot regions.

In addition, as illustrated in FIG. 8(B), one threshold value between 240 and 255 is distributed in each sub-matrix so that no halftone area with two or greater remaining dot regions is generated before all halftone dot areas have changed from the maximum size to a size with one remaining dot. Similarly, one threshold value between 224 and 239 is distributed in each sub-matrix so that no halftone dot area with three or more remaining dot regions is produced before all halftone areas have changed from a size with one remaining dot region to a size with two remaining dot regions.

Here, the "remaining dot regions" are the number of dot regions (quantity of remaining dot regions) required to reach the maximum size of the halftone dot area (a state in which there are no remaining dot regions). For example, if a halftone dot has a maximum size of sixteen dot regions, a halftone dot region with one remaining dot region signifies that the size of the halftone dot area has fifteen dot regions, while a halftone area with two remaining dot regions signifies that the size of the halftone dot area is fourteen dot regions.

However, when the image forming device 1 is in a state of positioning error, halftone dots formed on the recording paper 4 are almost imperceptible with a size of only one dot and only become perceptible at a size of two dots. Specifically, when the image forming device 1 is in the state of positioning error, the halftone dot having only one dot is, by transferring a minor amount of toner, formed with small size and lower density than that of the halftone dot to be formed by the image forming device 1 in the state of no positioning error. In such a case, a change in gradation is practically nonexistent (difficult to perceive) during the course of all halftone dot changing from a state of having no dots to a size of one dot, while a change in gradation seems to occur abruptly when the same halftone dots change from a one-dot size to a two-dot size.

Similarly, areas outside of the halftone dots formed in the image, the area corresponding to the blank area in the dither matrix, are virtually imperceptible when the halftone dots have a size of one remaining dot and only become perceptible when the halftone dots have a size of two remaining dots. Thus, a change in gradation is practically nonexistent when all halftone dots change from the maximum size to a size having one remaining dot, while the gradation change is sudden when the same halftone dots further change to a size of two remaining dots. In other words, the gradation characteristics (continuous tonality) of the image are severely degraded.

Hence, the dither matrix stored in the storing unit 74 provided on the image forming device 1 according to the first embodiment has threshold values that are set so as not to grow the plurality of halftone dots as uniformly as possible, as in the conventional method. Rather the threshold values are set so that one of the halftone dot areas and the blank areas having a size of two dots that can be easily perceived in a state of positioning error are mixed with one of the halftone dot areas and the blank areas having a size of one dot that are difficult to perceive in the same state.

In the dither matrix used in the image forming device 1 shown in FIGS. 9(A) and 9(B), the arrangement of threshold values between 1 and 32 and the arrangement of threshold values between 224 and 255 differ from the arrangements in the conventional dither matrix of FIG. 7, while the distribution of all other threshold values is the same.

Specifically, as shown in FIG. 9(A), threshold values between 1 and 32 are set in four of the sixteen sub-matrices arranged in four columns by four rows so that the halftone dot areas corresponding to the sub-matrices grow by two dots consecutively. These four sub-matrices are positioned at the intersections of the second and fourth columns and the second and fourth rows and will be referred to as "independent-growth sub-matrices." The consecutive threshold values are set to "1, 2", "7, 8", "13, 14", and "19, 20", skipping four threshold values in between. Accordingly, as the input gradation value increases, the following step (1) is performed once while performing the following step (2) a fixed number of times (five times in this example), and this pattern is repeated from the moment in which one of the sixteen halftone dot areas is generated until all sixteen halftone dot areas are generated. The halftone dot area consists of at least one dot region turned on. The dot region is turned on when the input gradation value is greater than or equal to the threshold value in the dot region.

(1) One of the sixteen halftone dot areas changes from a size of one dot region to a size of two dot regions.

(2) One of the sixteen halftone dot areas changes from a state of no dot regions to a size of one dot region.

In the other words, the dither matrix according to the first embodiment includes a first sub-matrix and three second sub-matrices. The first sub-matrix has a first threshold value smallest among threshold values in the first sub-matrix. In this embodiment, the sub-matrix positioned at the intersection of the second column and the fourth row corresponds to the first sub-matrix and has threshold value "19" smallest among threshold values in this sub-matrix. Among sixteenth sub-matrices, this sub-matrix is the latest sub-matrix in which dot regions turned on is generated as the input gradation value increases from one. The sub-matrices positioned at an intersection of the second column and the second row and at intersections of fourth columns and the second and fourth rows correspond to the second sub-matrices. That is, these sub-matrices are three of the independent-growth sub-matrices excluding the sub-matrix positioned at the intersection of the second column and the fourth row. Each of these second sub-matrices has a plurality of threshold values ("1, 2", "7, 8", "13, 14" in this embodiment) that are smaller than the first threshold value ("19" in this embodiment) and are arranged adjacent to each other. Further, the second sub-matrix has two continuous threshold values smaller than the first threshold value "19". Each of the remaining sub-matrices has one threshold value smaller than the first threshold value "19".

Each of the second sub-matrix and the all remaining sub-matrices (all fifteen sub-matrices except for the dither matrix positioned at the intersection of the second column and the fourth row) has a smallest threshold value and a second smallest threshold value. The smallest threshold value is smallest among threshold values in the each of the second sub-matrix and the all remaining sub-matrices and smaller than the first threshold value ("19" in the embodiment). The second smallest threshold value is positioned adjacent to the smallest threshold value and is second smallest among threshold values in the each of the second sub-matrix and the all remaining sub-matrices. For example, sub-matrix positioned at the intersection of the fourth column and the second row has the smallest threshold value "13" and the second smallest threshold value "14." Further, sub-matrix positioned at the intersection of the fourth column and the fourth row has the smallest threshold value "7" and the second smallest threshold value "8." At least two of the second smallest values are smaller than the first threshold value ("19"). Each difference between one of the second smallest threshold values ("8" in FIG. 9(A)) and other of the second smallest threshold values ("2", "14" in FIG. 9(A)) being an integral multiple of a prescribed value (6 in this case).

As shown in FIG. 9(B), threshold values between 224 and 255 have been set in the independent-growth sub-matrices so that their respective halftone dot areas grow twice consecutively. The consecutive threshold values are set to "236, 237", "242, 243", "248, 249", and "254, 255", skipping four threshold values between each pair. Accordingly, as the input gradation value decreases, the following step (3) is performed once while performing the following step (4) a fixed number of times (five times in this example), and this pattern is repeated from the moment in which only one of the sixteen halftone dot areas has decreased from its maximum size until all sixteen halftone dot areas have decreased from their maximum size.

(3) One of the sixteen halftone dot areas changes from a size of one remaining dot region to a size of two remaining dot regions. (One of the sixteen blank areas changes from a size of one dot region to a size of two dot regions.)

(4) One of the sixteen halftone dot areas changes from the maximum size to a size of one remaining dot region. (One of the sixteen blank areas changes from a size of zero dot region to a size of one dot region.)

In the other words, the dither matrix according to the first embodiment includes a third sub-matrix and three fourth sub-matrices. The third sub-matrix has a second threshold value largest among threshold values in the third sub-matrix. In this embodiment, the sub-matrix positioned at the intersection of the second column and the fourth row corresponds to the third sub-matrix and has threshold value "237" largest among threshold values in this sub-matrix. Among sixteenth sub-matrices, this sub-matrix is the latest sub-matrix in which dot regions turned off is generated as the input gradation value decreases from 255. The sub-matrices positioned at an intersection of the second column and the second row and at intersections of fourth columns and the second and fourth rows correspond to the fourth sub-matrices. That is, these sub-matrices are three of the independent-growth sub-matrices excluding the sub-matrix positioned in the second column and the fourth row. Each of these fourth sub-matrices has a plurality of threshold values ("242, 243", "248, 249", and "254, 255" in this embodiment) that are smaller than the second threshold value ("237" in this embodiment) and are arranged adjacent to each other. Further, the fourth sub-matrix has two continuous threshold values larger than the second threshold value "237". Each of the remaining sub-matrices has one threshold value larger than the first threshold value "237".

Each of the fourth sub-matrix and the all remaining sub-matrices (all fifteen sub-matrices except for the dither matrix positioned at the intersection of the second column and the fourth row) has a largest threshold value and a second largest threshold value. The largest threshold value is largest among threshold values in the each of the fourth sub-matrix and the all remaining sub-matrices and larger than the second threshold value ("237" in the embodiment). The second largest threshold value is positioned adjacent to the largest threshold value and is second largest among threshold values in the each of the fourth sub-matrix and the all remaining sub-matrices. For example, sub-matrix positioned at the intersection of the fourth column and the second row has the largest threshold value "243" and the second largest threshold value "242." Further, sub-matrix positioned at the intersection of the fourth column and the fourth row has the largest threshold value "249" and the second largest threshold value "248." At least two of the second largest values are larger than the second threshold value ("237"). Each difference between one of the second largest threshold values ("242" in FIG. 9(A)) and other of the second smallest threshold values ("254", "248" in FIG. 9(A)) being an integral multiple of a prescribed value (6 in this case).

Figure 10A:
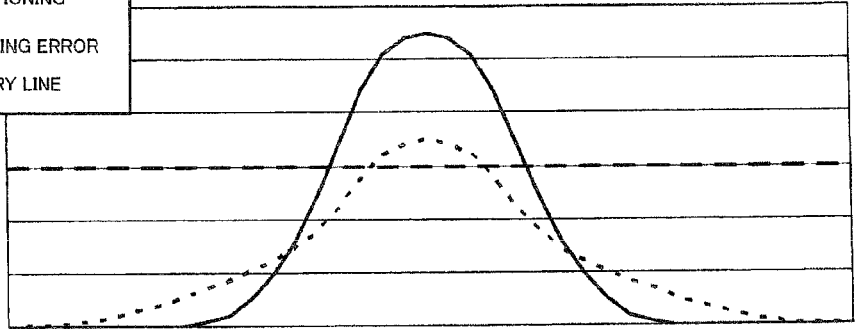
FIG. 10(A) is a graph showing variations in voltage on a surface of the photosensitive drum when single isolated dot is carried on the surface of the photosensitive drum.

FIG. 10(A) is a graph showing variations in voltage on the surface of the photosensitive drum 31 when latent image corresponding to a single isolated dot is carried on the surface of the photosensitive drum 31, where the vertical axis represents voltage and the horizontal axis the position in the main scanning direction. The boundary line along the horizontal axis (a straight dotted line) is a rough boundary indicating whether a large quantity of toner is deposited or not. More toner is likely to be deposited at positions higher above the boundary line. As shown in this graph, the change in voltage in a state of positioning error (indicated by a curved dotted line) has a gentler curving crest than that of the voltage change in a state of no positioning error (indicated by a solid curved line). Since the portion of voltage change that exceeds the boundary line in a state of positioning error is small, toner is less likely to be deposited.

Figure 10B:
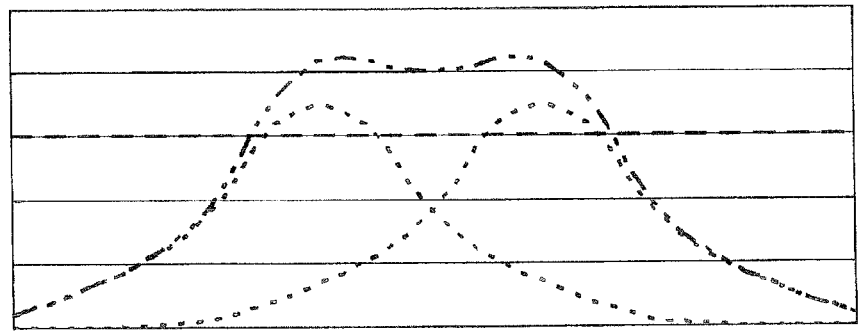
FIG. 10(B) is a graph showing variations in voltage on the surface of the photosensitive drum in the state of positioning error when two dots are arranged continuously on the surface of the photosensitive drum.

FIG. 10(B) is a graph showing changes in voltage in a state of positioning error when a latent image corresponding to two dots arranged continuously along the horizontal is formed on the photosensitive drum 31. As shown in the graph, the change in voltage per dot (indicated by a curved dotted line) for two dots are added to equal the change in voltage indicated by the broken line formed with alternating double-dots and dashes. Since the region of this broken line exceeding the boundary line increases, toner is more likely to be deposited.

Figure 10C:
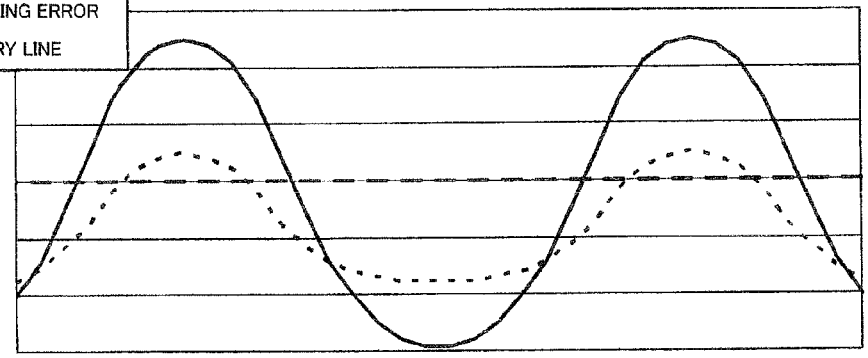
FIG. 10(C) is a graph showing changes in voltage on the surface of the photosensitive drum in the state of positioning error when no two dots are arranged continuously on the surface of the photosensitive drum.

FIG. 10(C) is a graph showing changes in voltage when a latent image corresponding to no dot area present in a continuous horizontal area equivalent to two dots is carried on the surface of the photosensitive drum 31. As shown in this graph, the change in voltage in a state of positioning error (indicated by the curved dotted line) forms a curve with a gentler crest and a broader base than those of the voltage changes in a state of no positioning error (indicated by the solid curved line). Hence, the voltage is also in a state of change in the blank areas, increasing the likelihood that a slight amount of toner will be deposited in these areas (increasing the likelihood of scattered toner). This may result in the blank areas being filled in, as described above.

Therefore, the dither matrix shown in FIGS. 9(A) and 9(B) used in the image forming device 1 according to the first embodiment has threshold values set so that blank areas and halftone dot areas of a two-dot size are generated periodically during the course of sequentially generating blank areas and halftone cells of a one-dot size. By using this dither matrix, it is possible to render gradations through blank areas and halftone dot areas of a two-dot size, even in a state of positioning error in which blank areas and halftone dot areas of a one-dot size are almost imperceptible, while blank areas and halftone dot areas of a two-dot size can be perceived, thereby preventing a severe worsening of gradation characteristics in the image. On the other hand, gradation characteristics are still preserved in a state of no positioning error, since the dither matrix used in the image forming device 1 according to the first embodiment modifies only the arrangement of threshold values from the arrangement used in the conventional dither matrix. Thus, the image forming device 1 can easily suppress a drop in image reproducibility (particularly a worsening of gradation characteristics, i.e., poor continuous tone) caused by offset in the focal point of the exposing means relative to the surface of the photosensitive member.

Figure 11:
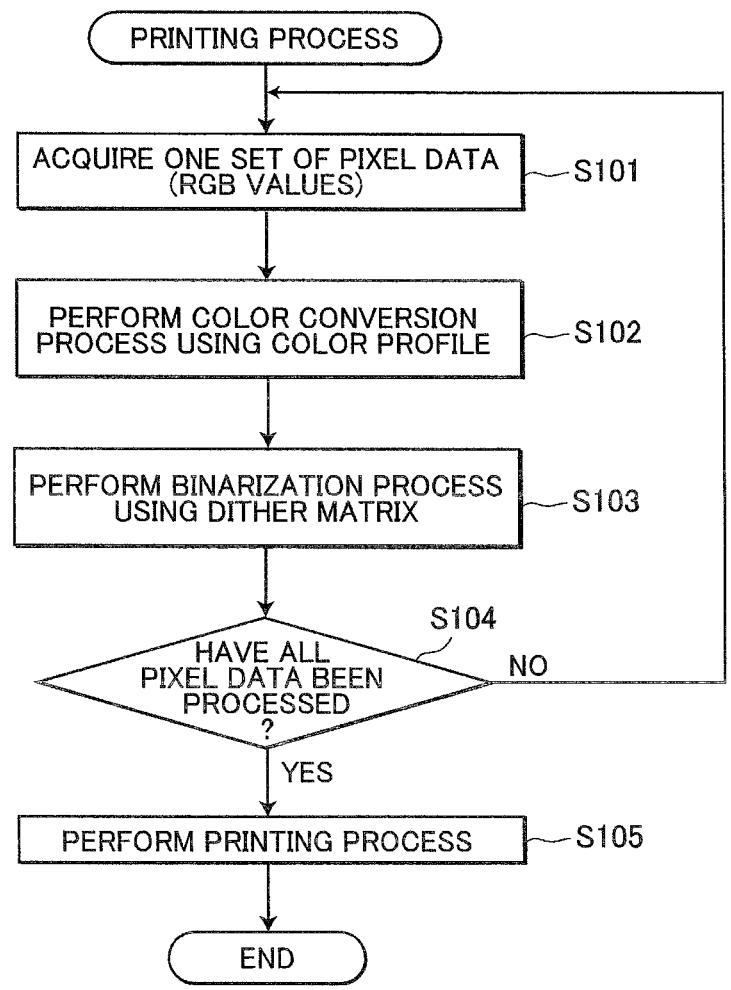
FIG. 11 is a flowchart illustrating steps in a printing process executed by the image processing device.

Next, a printing process executed by the control unit 70 for implementing the process described above will be described with reference to the flowchart in FIG. 11. The control unit 70 begins the printing process upon receiving a print command to print an image represented by print data (256-gradation RGB data).

In S101 at the beginning of the printing process, the control unit 70 acquires one pixel worth of unprocessed pixel data (RGB values) from among pixel data for individual pixels constituting an image represented by the print data.

In S102 the control unit 70 executes a color conversion process using the applicable color profile to convert this pixel data to 256-gradation CMYK values. In S103 the control unit 70 executes a binarization process using the dither matrix described above (see FIGS. 9(A) and 9(B)). In other words, the control unit 70 creates binary image data by comparing the input 256-gradation CMYK values to the threshold values of the dither matrix.

In S104 the control unit 70 determines whether the above process has been completed for all pixels in the image represented by the print data. If the process has not been completed for all pixels (if there remain unprocessed pixels), the control unit 70 returns to S101. However, when the control unit 70 determines that the process has been completed for all pixel data, in S105 the control unit 70 executes a printing operation based on the binary data generated in the binarization process, and subsequently ends the current printing process.

As described above, the image forming device 1 according to the first embodiment uses the dither matrix described with reference to FIGS. 9(A) and 9(B) for easily preventing a severe deterioration in image gradation characteristics when components in the image forming device 1 have positioning error. Since this dither matrix can maintain the same gradation characteristics as the conventional dither matrix when there is no positioning error, the dither matrix of the first embodiment can be used commonly for both the state of positioning error and the state of no positioning error, allowing for a much simpler process than when the image forming device 1 must determine which of specific dither matrices must be used for each state.

Next, a second embodiment of the present invention will be described with reference to FIGS. 12(A) and 12(B). The image forming device 1 according to the second embodiment has the same appearance and electrical structure as the image forming device 1 according to the first embodiment except for arrangement of the threshold values in the dither matrix.

The dither matrix used by the image forming device 1 according to the second embodiment shown in FIGS. 12(A) and 12(B) differs from the dither matrix used by the image forming device 1 according to the first embodiment (see FIGS. 9(A) and 9(B)) in the arrangement of threshold values from 1 to 32 and the arrangement of threshold values from 224 to 255. The arrangement of all other threshold values in the second embodiment is identical to that in the first embodiment.

Specifically, as shown in FIG. 12(A), threshold values between 1 and 32 are set in four of the sixteen sub-matrices arranged in four columns by four rows, so that the halftone dot areas corresponding to the sub-matrices reach a size of two dot regions from the stage that no halftone dot areas have been generated until all halftone dot areas have been generated. These four sub-matrices are positioned at the intersections of the first and third columns and the first and third rows and will be referred to as "common-growth sub-matrices." The threshold values for changing halftone dot area from a size of one dot region to a size of two dot regions in the common-growth sub-matrix are set to "2", "6", "11", and "16", skipping three or four threshold values in between. Accordingly, as the input gradation value increases, the following step (1) is performed once while performing the following step (2) three or four times, and this pattern is repeated from the moment in which one of the sixteen halftone dot areas is generated until all sixteen halftone dot areas are generated.

(1) One of the sixteen halftone dot areas changes from a size of one dot region to a size of two dot regions.

(2) One of the sixteen halftone dot areas changes from a state of no dot regions to a size of one dot region.

In other words, in the dither matrix shown in FIG. 12(A), the sub-matrix positioned at the intersection of the fourth column and the first row corresponds to the first sub-matrix and has threshold value "20" smallest among threshold values in this sub-matrix. Among sixteenth sub-matrices, this sub-matrix is the latest sub-matrix in which dot regions turned on is generated as the input gradation value increases from one. The sub-matrices positioned at intersections of the first column and the first and third rows and the sub-matrix positioned at an intersection of the third column and the third row correspond to the second sub-matrices. That is, these sub-matrices are all the common-growth sub-matrices excluding the sub-matrix positioned at an intersection of the first column and the first row. Each of these second sub-matrices has a plurality of threshold values ("5, 16", "4, 11", "3, 6" in the second embodiment) that are smaller than the first threshold value ("20" in this embodiment) and are arranged adjacent to each other.

Each of the remaining sub-matrices has one threshold value smaller than the first threshold value "20". The all remaining sub-matrices include a fifth sub-matrix. The fifth sub-matrix has a third threshold value smallest among threshold values in the fifth sub-matrix. The third threshold value is smaller than the first threshold value. The second sub-matrix has a fourth threshold value smaller than the third threshold value and a fifth threshold value that is larger than the third threshold value and smaller than the first threshold value and is positioned adjacent to the fourth threshold value. For example, the sub-matrix positioned at an intersection of the second column and the second row, as one of the fifth sub-matrix, has a smallest value "7" as the third value. The sub-matrix positioned at the intersection of the first column and the third row has "4" as the fourth threshold value smaller than third threshold value "7" and "11" as the fifth threshold value that is larger than the third threshold value "7" and smaller than the first threshold value "20".

As shown in FIG. 12(B), threshold values between 224 and 255 have been set in the independent-growth sub-matrices so that their respective halftone dot areas grow twice consecutively from the moment in which all sixteen halftone dot areas are generated until fifteen of the sixteen halftone dot areas is generated. The threshold values for changing halftone from a size of one remaining dot to a size of two remaining dots in the common-growth sub-matrix are set to "254", "250", "245", and "240", skipping three or four threshold values between each pair. Accordingly, as the input gradation value decreases, the following step (3) is performed once while performing the following step (4) three or four times, and this pattern is repeated from the moment in which only one of the sixteen halftone dot areas has decreased from its maximum size until all sixteen halftone dot areas have decreased from their maximum size.

(3) One of the sixteen halftone dot areas changes from a size of one remaining dot region to a size of two remaining dot regions.

(4) One of the sixteen halftone dot areas changes from the maximum size to a size of one remaining dot region.

In other words, in the dither matrix shown in FIG. 12(B), the sub-matrix positioned at the intersection of the fourth column and the first row corresponds to the third sub-matrix and has threshold value "236" largest among threshold values in this sub-matrix. Among sixteenth sub-matrices, this sub-matrix is the latest sub-matrix in which dot regions turned off is generated as the input gradation value decreases from 255. The sub-matrices positioned at intersections of the first column and the first and third rows and the sub-matrix positioned at an intersection of the third column and the third row correspond to the second sub-matrices. That is, these sub-matrices are all the common-growth sub-matrices excluding the sub-matrix positioned at an intersection of the first column and the first row. Each of these second sub-matrices has a plurality of threshold values ("253, 250", "252, 245", "251, 240" in the second embodiment) that are larger than the second threshold value ("236" in this embodiment) and are arranged adjacent to each other.

Each of the remaining sub-matrices has one threshold value larger than the second threshold value "236". The all remaining sub-matrices include a seventh sub-matrix. The seventh sub-matrix has a sixth threshold value largest among threshold values in the seventh sub-matrix. The sixth threshold value is larger than the second threshold value. The fourth sub-matrix has a seventh threshold value larger than the sixth threshold value and a eighth threshold value that is smaller than the sixth threshold value and larger than the second threshold value and is positioned adjacent to the seventh threshold value. For example, the sub-matrix positioned at an intersection of the second column and the second row, as one of the seventh sub-matrix, has a largest value "249" as the sixth value. The sub-matrix positioned at the intersection of the first column and the third row has "252" as the seventh threshold value larger than sixth threshold value "249" and "245" as the eighth threshold value that is smaller than the sixth threshold value "252" and larger than the second threshold value "236".

Hence, the dither matrix used by the image forming device 1 according to the second embodiment differs from that used by the image forming device 1 according to the first embodiment in that there is no restriction on threshold values stipulating that halftone dot areas must grow by two dots consecutively. Specifically, the threshold values are set in the common-growth sub-matrices so that, as the input gradation value increases, the halftone dot areas corresponding to the common-growth sub-matrices change from a one-dot size to a two-dot size at a substantially fixed timing from the state in which only one of the halftone dot areas has been generated until all halftone dot areas have been generated and, as the input gradation value decreases, the halftone dot areas change from a size of one remaining dot region to a size of two remaining dot regions at a substantially fixed timing within the process from the state in which only one of the halftone cells is not the maximum size until all of the halftone cells are no longer the maximum size.

The same effects obtained with the dither matrix used by the image forming device 1 according to the first embodiment can be obtained using the dither matrix according to the second embodiment described above.

Compared to the first embodiment, the dither matrix used by the image forming device 1 according to the second embodiment is more efficient at generating halftone dot areas or blank areas as uniformly as possible across the entire dither matrix. For example, when comparing the two dither matrices for the case in which the input level is "16," the dither matrix according to the first embodiment has a noticeable bias in the arrangement of sub-matrices for which halftone dot areas were produced and sub-matrices for which halftone dot areas were not produced, as shown in FIG. 9(A), while the dither matrix according to the second embodiment has a more uniform distribution of halftone cells, as shown in FIG. 12(A). The same point can be made for an input level of "239" in the examples of FIGS. 9(B) and 12(B).

While the invention has been described in detail with reference to the embodiments thereof, it would be apparent to those skilled in the art that various changes and modifications may be made therein without departing from the spirit of the invention.

For example, in the first and second embodiments described above, the LEDs are used as the light-emitting elements of the present invention, but the present invention may be applied to devices having a similar function.

Further, the dither matrix described in the first and second embodiments has threshold values set in order to periodically generate blank areas and halftone dot areas having a two-dot size during the course of sequentially generating blank areas and halftone dot areas of a one-dot size, but the present invention is not limited to this configuration. For example, the threshold values may be set to periodically generate blank areas and halftone cells having a size of three dots or more during the course for sequentially generating blank areas and halftone dot areas of a one-dot size. With this configuration, the same effects described in the first and second embodiments can be obtained if, for example, blank areas and halftone dot areas having a size of two dot regions or less are almost imperceptible in a state of positioning error, while blank areas and halftone dot areas having a size of three dot regions or greater can be perceived.

In the first and second embodiments described above, components of the image forming device 1 serve as the image processing device of the present invention, but the image processor may be provided separately from the image-forming device. For example, a personal computer having a printer driver compatible with the image-forming device installed thereon may function as the image process of the present invention. Specifically, if the personal computer is configured to generate binary image data based on print data and subsequently transmit this binary image data to the image-forming device, the personal computer can execute a process similar to that described in S101-S104 of the printing process shown in FIG. 11.

Further, the threshold values of the dither matrix may be arranged such that a number of halftone dot area, which are generated from when one of the halftone dot area changes from a size of one dot region to a size of two dot regions until when next halftone dot area changes from a size of one dot region to a size of two dot regions, is determined at random.

What is claimed is:

1. An image processing device comprising:
   a storing unit that stores a dither matrix, the dither matrix having a plurality of dot regions and having a threshold value at each of the dot regions, the plurality of dot regions being divided into a plurality of sub-matrices arranged within the dither matrix; and
   a creating unit that is configured to create binary image data by comparing an input value to the threshold values,
   wherein the plurality of sub-matrices include a first sub-matrix and a second sub-matrix, the first sub-matrix having a first threshold value smallest among threshold values in the first sub-matrix, the second sub-matrix having a plurality of threshold values that are smaller than the first threshold value and are arranged adjacent to each other, each of all remaining sub-matrices having at least one threshold value smaller than the first threshold value, and
   wherein the plurality of sub-matrices include a third sub-matrix and a fourth sub-matrix, the third sub-matrix having a second threshold value largest among threshold values in the third sub-matrix, the fourth sub-matrix having a plurality of threshold values that are larger than the second threshold value and are arranged adjacent to each other, each of all remaining sub-matrices having at least one threshold value larger than the second threshold value.

2. The image processing device according to claim 1, the second sub-matrix has two continuous threshold values smaller than the first threshold value.

3. The image processing device according to claim 1, the fourth sub-matrix has two continuous threshold values larger than the second threshold value.

4. The image processing device according to claim 1, wherein the all remaining sub-matrices include a fifth sub-matrix, the fifth sub-matrix having a third threshold value smallest among threshold values in the fifth sub-matrix, the third threshold value being smaller than the first threshold value, the second sub-matrix having a fourth threshold value smaller than the third threshold value and a fifth threshold value that is larger than the third threshold value and smaller than the first threshold value and is positioned adjacent to the fourth threshold value.

5. The image processing device according to claim 1, wherein the all remaining sub-matrices include a seventh sub-matrix, the seventh sub-matrix having a sixth threshold value largest among threshold values in the seventh sub-matrix, the sixth threshold value being larger than the second threshold value, the fourth sub-matrix having a seventh threshold value larger than the sixth threshold value and a eighth threshold value that is smaller than the sixth threshold value and larger than the second threshold value and is positioned adjacent to the seventh threshold value.

6. The image processing device according to claim 1, wherein each of the second sub-matrix and the all remaining sub-matrices has a smallest threshold value and a second smallest threshold value, the smallest threshold value being smallest among threshold values in the each of the second sub-matrix and the all remaining sub-matrices and smaller than the first threshold value, the second smallest threshold value being positioned adjacent to the smallest threshold value and being second smallest among threshold values in the each of the second sub-matrix and the all remaining sub-matrices, at least two of the second smallest values being smaller than the first threshold value, each difference between one of the second smallest threshold values and other of the second smallest threshold values being an integral multiple of a prescribed value.

7. The image processing device according to claim 1, wherein each of the fourth sub-matrix and the all remaining sub-matrices has a largest threshold value and a second largest threshold value, the largest threshold value being largest among threshold values in the each of the fourth sub-matrix and the all remaining sub-matrices and larger than the second threshold value, the second largest threshold value being positioned adjacent to the largest threshold value and being second largest among threshold values in the each of the fourth sub-matrix and the all remaining sub-matrices, at least two of the second largest values being larger than the second threshold value, each difference between one of the second largest threshold values and other of the second largest threshold values being an integral multiple of a prescribed value.

* * * * *